Figure 1A:
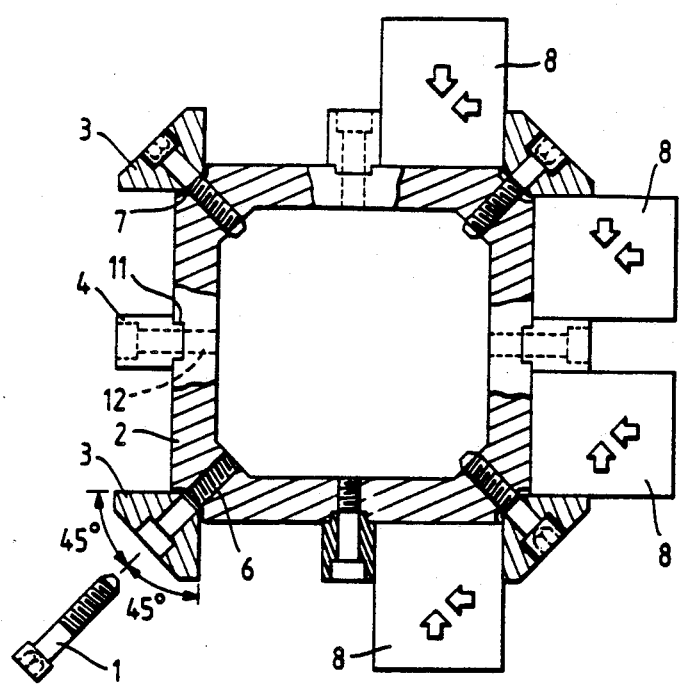

United States Patent [19]

Kytölä

[11] Patent Number: 4,921,378
[45] Date of Patent: May 1, 1990

[54] ROTARY-PALLET SYSTEM
[75] Inventor: Olli Kytölä, Muurame, Finland
[73] Assignee: OK-Vise Ky, Muurame, Finland
[21] Appl. No.: 249,563
[22] PCT Filed: Jan. 22, 1988
[86] PCT No.: PCT/FI88/00006
  § 371 Date: Sep. 19, 1988
  § 102(e) Date: Sep. 19, 1988
[87] PCT Pub. No.: WO88/05364
  PCT Pub. Date: Jul. 28, 1988

[30] Foreign Application Priority Data
  Jan. 23, 1987 [FI] Finland .................. 870290
[51] Int. Cl.$^5$ .............................. B23Q 3/06
[52] U.S. Cl. ...................... 409/221; 269/57;
  269/137; 269/154; 269/217; 269/234; 409/198;
  409/225; 409/903
[58] Field of Search .............. 269/57, 136–138,
  269/154, 217, 234; 409/163, 164, 189, 197, 198,
  205, 219–221, 224, 225, 263, 276–278, 903

[56] References Cited
U.S. PATENT DOCUMENTS
3,385,138 5/1968 Wusteney et al. .................. 269/57
4,489,927 12/1984 Yamada et al. .................. 269/137
4,643,411 2/1987 Izumi .......................... 269/138 X FOREIGN PATENT DOCUMENTS
938404 10/1963 United Kingdom ............. 269/137

Primary Examiner—Steven C. Bishop
Attorney, Agent, or Firm—Hopgood, Calimafde, Kalil, Blaustein & Judlowe

[57] ABSTRACT

Rotary-pallet system, in particular for multi-directional machining of the pieces (8) to be machined. In the said system there is a body piece (2), one of whose ends (A) is attached to a holder, which said body piece is rotable around a longitudinal axis (A-B), and against whose longitudinal guide faces one or several pieces (8) to be machined can be positioned. One or several wedge pieces (3) can be attached to the edge of the guide face on the body (2), the wedge face on the said wedge piece being pressed towards a side of the piece (8) to be machined. A counter-face (4, 13) is provided at the opposite side of the piece to be machined. The wedge piece (3) can be attached to the body (2) by means of a fastening member (1), which is directed in such a way diagonally that the direction of the fastening movement of the wedge piece approaches both the body (2) and the piece (8) to be machined at the same time.

10 Claims, 5 Drawing Sheets fig. 1.c
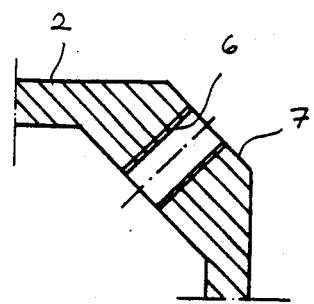
fig. 1.b
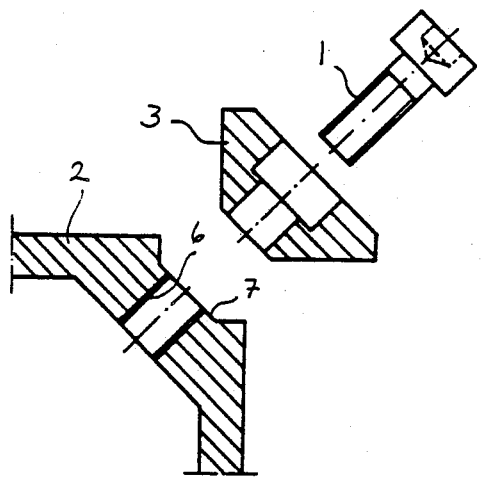
fig. 1.d
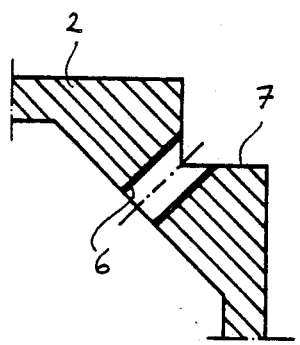

ROTARY-PALLET SYSTEM

The present invention concerns a rotary-pallet system, in particular for multi-directional machining of the pieces to be machined, in which said system there is a body piece, one of whose ends is attached to a holder, which is rotable around a longitudinal axis, and against whose longitudinal guide faces one or several pieces to be machined can be positioned.

There is a considerable variety among rotary-pallet systems. Generally speaking, they are complicated, difficult to use, and require one or several fastening members per one piece to be machined and are, as a rule, not suitable for multi-directional machining.

There are many reasons to minimize the changes of tools to a level as low as possible, because it is these changes that cause most of the servicing on the machines. Reasons for this are, e.g.:

contaminations remaining between the grip faces of the tools cause centering faults, vibration, and wear of the tapers on the tools, wear of the tool change mechanism, loss of working time during change of tool.

The precision of location on the CNC machines is in itself very high. The largest dimensional errors mostly result from an excessively high number of different fastening steps, examples of which are:

incorrect choice of fastening and guide plane, faults of shape and dimension on pieces, dimensional errors caused by chips and impurities, incorrect location in view of the program.

It should be noticed that the fault does not consist of one of these, but it is an aggregate sum of all of these factors together.

The rotary-pallet system in accordance with the invention is mainly characterized in that one or several wedge pieces can be attached to the edge of the guide face on the body, the wedge face on the said wedge piece being pressed towards a side of the piece to be machined, whereat a counter-face is provided at the opposite side of the piece to be machined, and that the wedge piece can be attached to the body by means of a fastening member, which is directed in such a way diagonally or radially towards the longitudinal axis of the body that the direction of the fastening movement of the wedge piece approaches both the body and the piece to be machined at the same time.

The present new rotary-pallet system involves considerable advantages:

With one fastening, the precision of the readymachined piece is almost the same as the locating precision of the machine.

The pieces to be machined need not be hammered, because the fastening member also pulls them against their base.

Fastening members of low height permit machining of the outer plane of the piece by means of frontal cutters as well as machining of edge chamfers.

By means of the shape, length and location of the wedge pieces and of the support guides, it is possible to perform drillings, countersinkings, etc. in the directions of 90° or 180° right down to the bottom plane.

When pieces of irregular shape are being fastened, the desired fastening points are chosen and the base, the guide support, and the wedges are shaped so that they become suitable for the fastenings and machinings.

The smaller the requirement of space of the fastening member, the more will there be space available for the pieces to be machined.

The invention and its details will be described in more detail in the following with reference to the attached drawings, wherein FIG. 1a is a sectional view of a fastening member to which 8 lines of rectangular pieces to be machined can be attached, FIG. 1b is a detail of FIG. 1a, FIG. 1c is one alternative for the detail of FIG. 1b, FIG. 1d is another alternative for the detail of FIG. 1b.

Figure 2:
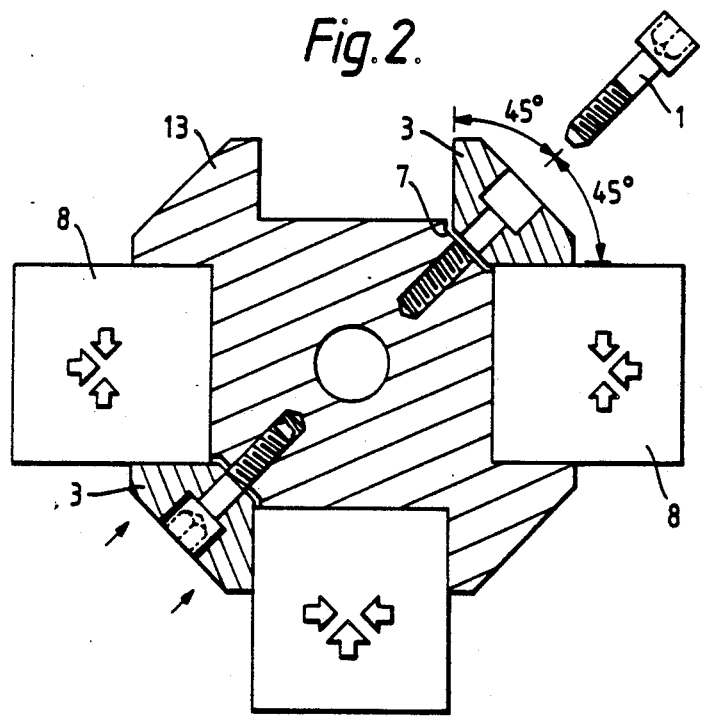
Figure 3A:
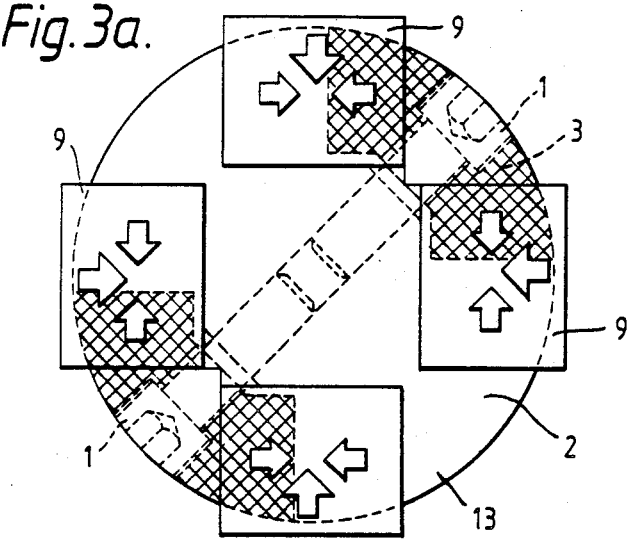
Figure 3B:
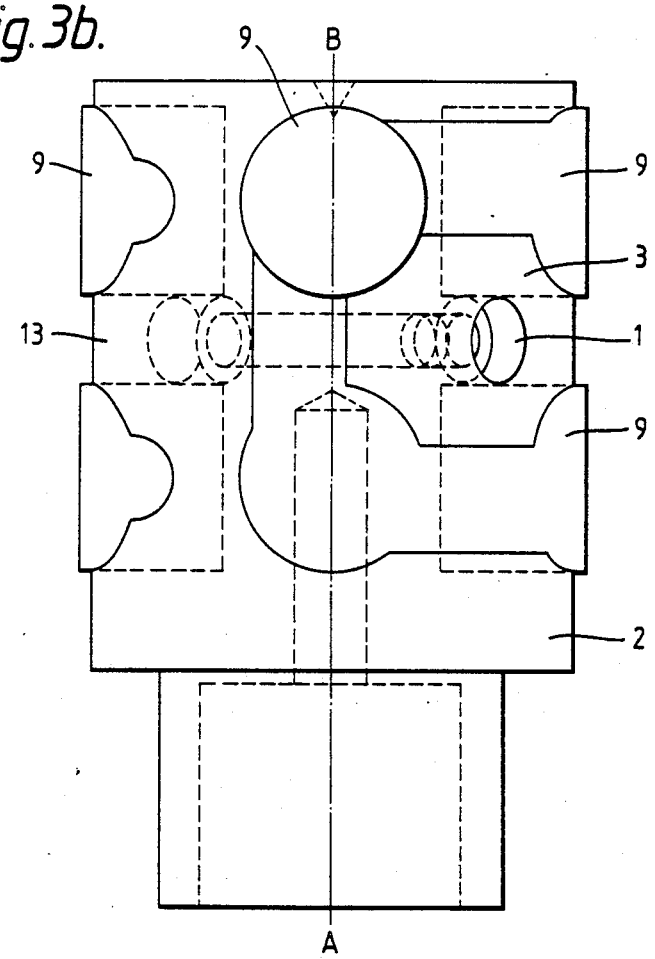
Figure 4A:
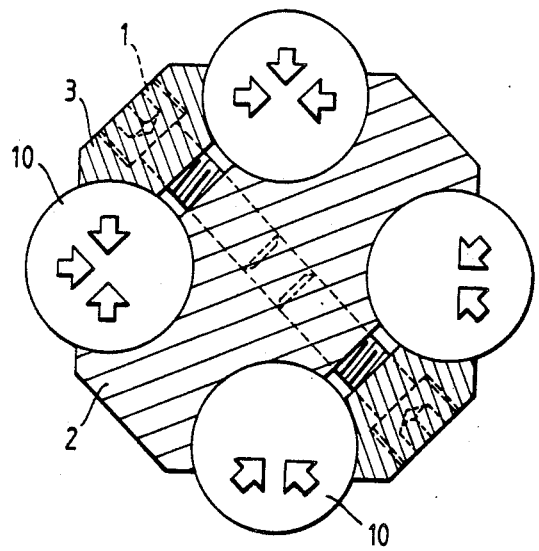
Figure 4B:
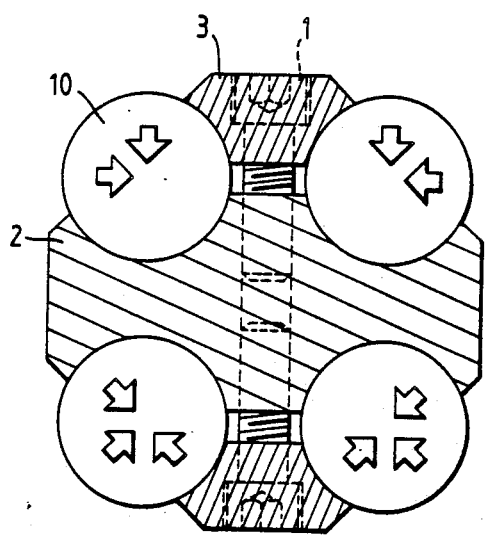
Figure 5:
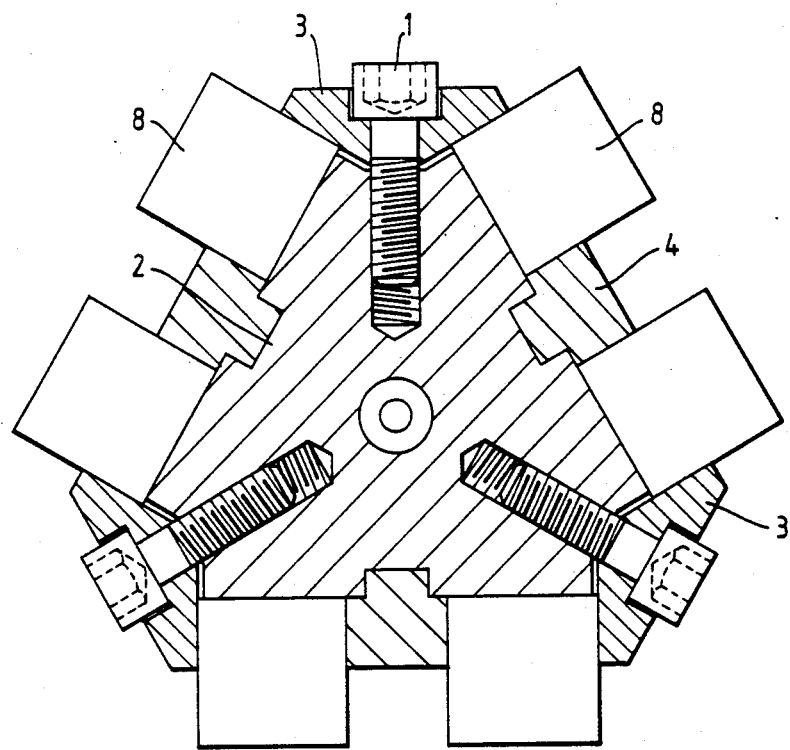

FIG. 2 is a sectional view of a fastening member to which 4 lines of rectangular pieces to be machined can be attached, FIG. 3a is a sectional view of a fastening member to which 4 lines of cylindrical pieces can be attached so that one end of the cylinders is facing the central axis of the fastening member, FIG. 3b is a side view of the fastening member shown in FIG. 3a, FIG. 4a is a sectional view of a fastening member to which cylindrical pieces to be machined can be attached so that the axes of the cylinders are parallel to the central axis of the fastening member, FIG. 4b is a sectional view of the fastening member shown in FIG. 4a, rotated over 45° around its central axis, and FIG. 5 is a schematical sectional view of a fastening member provided with a three-sided body.

The fastening member in accordance with the invention comprises a body 2, in which, at the end A of the axial centre line of the body, there is an attachment to an indexed table or to the index head (not shown in the Figure) of the machine. At the opposite end B of the body, there is a corresponding centre for the support bearing (FIG. 3b).

In the embodiment shown in FIG. 1a, the body 2 of the rotary pallet has four sides. The edges of the body are chamfered, and into them grooves 7 parallel to the axis of the body have been formed, the bottoms of the said grooves forming an angle of 135° with the sides of the body. In the bottom of the grooves, there is a line of holes 6 with inside threading, which said holes are directed towards the central axis of the body. Into the grooves 7, wedge pieces 3 have been attached by means of screws 1, on which said wedge pieces the face facing the groove 7 and the opposite face are parallel to the bottom of the groove 7. Thereat, the screw 1 is at an angle of 45° relative the sides of the body 2 and substantially radially disposed around the body relative to the longitudinal axis A-B of the body. The sides of the wedge pieces are at a right angle to the side faces of the body 2. Each groove has either one oblong wedge piece or several wedge pieces in a line. The wedge pieces are provided with return springs (not shown in the Figures), which attempt to push the wedge pieces apart from the body 2.

At the middle between the four guide sides of the body there are likewise axial grooves 11, in which there are holes 12 with inside threading for the fastening of the middle support guides 4 by means of screws. In the embodiment of FIG. 1, the sides of the middle support guides form a right angle with the guide sides of the body. It is possible to use middle supports 4 of different widths, depending on the size of the pieces to be machined.

In the embodiment of FIG. 1a, the pieces 8 to be machined are rectangular prisms, and they are fixed against the guide faces of the rectangularly shaped body 2 and against the middle support guide 4 by tightening the wedge pieces 3 by means of screws 1 towards the body 2. In this way it is possible to set the distance between the middle support guides 4 and one side of the wedge piece 3 in accordance with the pieces 8 to be attached.

The arrows drawn on the pieces to be machined denote the two principal machining directions of the pieces. It is seen that, when the body 2 is rotated around its central axis four times over 90°, all the pieces 8 attached to it in eight lines can be machined from two directions by using two machining directions.

FIG. 1b shows one corner of the body 2 shown in FIG. 1a, and a wedge piece 3 to be fitted in it and a screw 1.

FIG. 1c shows an alternative in which a flat chamfer parallel to the bottom of the wedge piece has been used instead of the groove 7 in the corner.

In FIG. 1d again, the groove 7 has been formed by means of two surfaces parallel to the wedge surfaces of the wedge piece.

In fact, the forms of the bottom surface of the wedge piece 3 and the surface of the body 2 facing the wedge piece are not important because usually there remains a gap between the surfaces. Important is only the fact that the wedge surfaces of the wedge piece and the guide surface of the body are formed according to the piece 8 to be machined.

In the embodiment shown in FIG. 2, instead of separate support guides 4, projecting wings 13 provided on the body 2 have been used, which said wings form the counter-face supporting the piece and positioned against one side of the pieces 8. The sides of the wings are at a right angle relative the guide faces of the body. In this case, the pieces to be machined have been fixed in four lines, one line at each side of the body. It is seen that all the pieces can be machined from three directions when the machining takes place from above and from two sides and when the body is rotated over 90° between the different steps.

FIGS. 3a and 3b show an embodiment to which cylindrical pieces 9 to be machined can be attached in four lines of two pieces so that one end of the cylinders is facing the central axis of the body and the axes of the cylinders are placed radially to the axis of the body. The body is provided with wings 13 acting as counter-faces, and the fastening takes place by means of two wedge pieces 3, which are pressed towards the body by means of screws 1. The wings 13 and the wedge pieces 3 are shaped in accordance with the cylinder faces of the pieces 9.

FIGS. 4a and 4b show an embodiment in which the pieces 10 to be attached are also cylindrical, but the axes of the cylinders are parallel to the central axis of the body 2. The counter-faces on the body and the wedge pieces 3 are shaped accordingly, so that they become positioned against the cylinder faces. In FIG. 4b the body has been rotated over 45° from the position shown in FIG. 4a. It is seen that, in addition to the three machining directions obtained from the rotations of 90°, two further machining directions are obtained.

Most appropriately, in the embodiment shown in FIGS. 4a and 4b, the curve radius of the cylinder faces on the wedge pieces 3 and on the body 2 is somewhat larger than the curve radius of the cylinders 10 to be machined, in which case the pieces become positioned stably in spite of minor dimensional deviations.

The invention is not confined to the embodiments described above only, but it may show variation in many ways within the scope of the patent claims. The shape of the pieces 8, 9, 10 to be attached may also be different from a prism or cylinder, in which case the wedge piece 3 and the stationary counter-face on the body 2 and the counter-face on a separate support guide 4, if any, possibly attached to the body are shaped in accordance with the piece to be machined.

Besides being 4-sided, the body 2 may also be, e.g., 3-sided (triangular section). When the body is 3-sided, it is possible to use wedge pieces whose sides form an angle of 120° with each other, in which case the screw 1 forms an angle of 30° with the sides of the body (FIG. 5).

It is also possible to use a 6-sided body (hexagonal section). In this case the sides of the wedge piece form an angle of 60° with each other.

What is claimed is:

1. A device adapted for the multi-directional machining of shaped workpieces (8,9,10) comprising:
    a rotary-pallet device formed of a body portion (2) rotable about a longitudinal axis (A-B) and having an outer surface or guide face characterized by at least one counter-face (4,13)
    at least one wedge piece (3) diagonally attachable to the surface of said body portion (2) at one edge thereof spaced from said at least one counter-face (4,13)
        the space between said counter-face (4,13) and a face of said wedge piece (3) being adapted to receive a workpiece (8,9,10) to be machined, and
    a fastening member (1) passing in a diagonal direction through said at least one wedge piece into said body portion (2),
    said fastening member when fastened to body portion (2) of the rotary-pallet device applies a force to said wedge-piece (3) which in turn applies a force via a wedge surface to the workpiece and forces it against said counter-face (4,13) to firmly hold said workpiece (8,9,10) in place for multi-directional machining.

2. The rotary-pallet device as in claim 1, wherein the outer surface of said body portion (2) is comprised of two or more guide faces, each including said counter-face (4,13), said wedge piece (3) being characterized by two wedge faces and being attachable between said guide faces in side-by-side relationship and thereby provide a space between each wedge piece (3) and said counter-face (4,13) on said guide faces to enable workpieces (8,9,10) to be held firmly in said space by coaction with said counter-face (4,13) and with each side of said wedge piece (3) for multi-directional machining.

3. The rotary-pallet device as in claim 2, wherein the diagonal direction of fastening member (1) is such as to bi-sect an angle formed between the guide faces and the wedge faces of wedge piece (3).

4. The rotary-pallet device as in claim 3, wherein body portion (2) is rectangularly shaped to provide four corners such as to define four guide faces perpendicular to each other against each of which at least one workpiece (8,9,10) is attachable and characterized in that the fastening direction of fastener member (1) forms an angle of about 45° with the guide faces at each side thereof.

5. The rotary-pallet device as in claim 4, wherein said wedge pieces (3) are attachable at each corner between the four guide faces.

6. The rotary-pallet device as in claim 4, wherein wedge pieces (3) are attachable at two opposite corners between the guide faces of body portion (2).

7. The rotary-pallet device of claim 2, wherein each counter-face (13) is formed as a guide stop projecting from body portion (2) and made of one piece with the body.

8. The rotary-pallet device as in claim 2, wherein counter-faces 4 are detachable connected to body portion (2).

9. The rotary-pallet device as in claim 2, wherein said fastening member (1) is a displaceable threaded screw or spindle.

10. The rotary-pallet device as in claim 2, wherein the space provided between each wedge piece (3) and each counter-face (4,14) is selected to conform to the exterior shape of either of workpieces (8,9,10).

* * * * *